Figure 1:
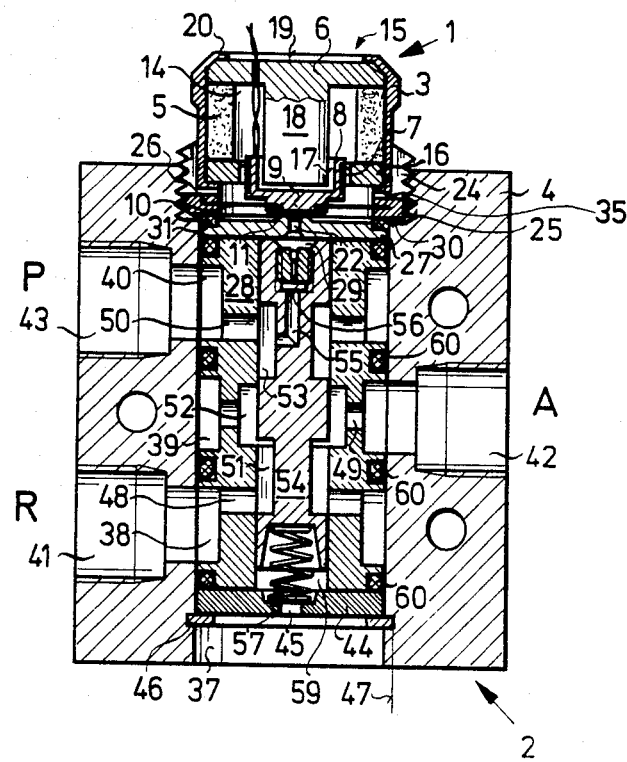

United States Patent [19]

Goedecke et al.

[11] Patent Number: 4,524,804
[45] Date of Patent: Jun. 25, 1985

[54] ELECTROPNEUMATIC SERVO VALVE FOR CONTROLLING A VOLUME CURRENT AND PRESSURE, RESPECTIVELY

[75] Inventors: Wolf-Dieter Goedecke, Unterkirnach; Gerhard Schneckenburger, Hüfingen; Reinhard Schwenzer, Aachen, all of Fed. Rep. of Germany

[73] Assignee: Kienzle Apparate GmbH, Villingen, Fed. Rep. of Germany

[21] Appl. No.: 490,665

[22] Filed: May 2, 1983

[30] Foreign Application Priority Data

May 5, 1982 [DE] Fed. Rep. of Germany ....... 3216693

[51] Int. Cl.³ ............................................. F15B 13/043
[52] U.S. Cl. ............................ 137/625.64; 137/625.65
[58] Field of Search ....................... 137/625.64, 625.65

[56] References Cited

U.S. PATENT DOCUMENTS 4,196,751 4/1980 Fischer et al. ................. 137/625.65
4,378,031 3/1983 Nicholson et al. ........ 137/625.64 X Primary Examiner—Edward G. Favors
Attorney, Agent, or Firm—Toren, McGeady, Stanger

[57] ABSTRACT

Electropneumatic servo valve for controlling a volume current or a pressure, respectively.

The subject matter of the invention relates to a two-stage, electropneumatic servo valve for controlling a volume current. The servo valve (1, 2) consists of an electromechanically controllable preliminary control stage (1), by means of which electric control signals are converted into pneumatic control pressure in a control air space (29) between the preliminary control stage (1) and a valve main stage (2) with a nozzle impact plate system (22, 9). The variably controllable control air pressure in the control air space (29) serves as actuating force for positioning a control piston (54) in the valve main stage (2), on the basis of which a proportional volume current can be adjusted at an operating output (A).

The electropneumatic servo valve (1, 2) serves to convert electric control signals of low power for controlling a relatively large volume current for the operation of pneumatic drives.

5 Claims, 2 Drawing Figures

ELECTROPNEUMATIC SERVO VALVE FOR CONTROLLING A VOLUME CURRENT AND PRESSURE, RESPECTIVELY

The subject matter of the invention relates to an electropneumatic servo valve for controlling a volume current and a pressure, respectively.

By the term, electropneumatic servo valve, is meant, in a general way, a device or a valve, respectively, for the analog control of an air current or air pressure on the basis of the input of a corresponding electric signal. A precondition here is to ensure that a corresponding pressure or volume current can be uniquely assigned to a determined electric input signal at the output of the servo valve. Finally, in the foreground of such an electropneumatic transformer, is the goal of the greatest possible analog amplification of the input signal. In practice, this signifies that, e.g., with a smallest possible input current of approximately 200 mA, one can control a through-flow volume of approximately 500 l/min. at the valve output. Such a large amplification effect with the least power consumption on the control input side is understandably desired by the user in a time of increasingly expanding electric and electronic control systems, in the field of pneumatics as well. But this is not easily attainable: because, for this purpose, it is necessary that all influencing factors effective in this regard, with respect to component parts and the combinations of control elements among the actual valve structural components, be adjusted to one another in an optimal manner. Essentially, electropneumatic valves can be divided into two structural types on the basis of their manner of functioning: directly actuated valves and indirectly actuated valves. In the directly actuated valve the actuating force for moving or actuating the valve closing element is produced directly by an electromagnet; that is, the controllable opening or through-pass volumes or pressure relations are directly dependent on the force available from the magnet. Although such valves are distinguished by a functionally simple construction, high electric power in a correspondingly large structural volume on the electric control side is necessary in order to produce great forces.

The indirectly actuated valve or servo valve is a valve with at least two stages in which an electromagnet actuates, e.g., a so-called pilot valve, which actuates the main valve by means of the application of pressure of the control piston. A very substantial advantage in this kind of servo valve is to be seen in that the opening volumes, which are controllable with the main valve, are not dependent on the actuating force of the magnet in the control part or pilot valve, respectively. That is, in other words, the necessary electric power consumption for the control effect is determined exclusively by means of the electromagnet of the pilot valve.

It is the object of the invention to develop an electrically controllable, pneumatic servo current valve as a signal transformer, with which a large air current opening volume can be controlled in a minimal structural dimensioning of the valve with a low electric control power, while taking into account high requirements in dynamic behavior.

This task is met, in accordance with the invention, through the combination of a preliminary control stage, which converts electric signals into pneumatic control air pressure, with a valve main stage adjustable by means of the control air pressure of the preliminary control stage. This combination is effected in such a way that a control piston of the valve main stage can be driven against the action of a restoring force by means of a control air pressure which can be converted in proportional pneumatic pressure in a control air space between the preliminary control stage and the valve main stage by means of electric signals via a nozzle impact plate system. This is effected in such a way that the control piston can be positioned for the control of a proportional volume current in dependence on the control air pressure.

Other characteristic features for the construction of the invention are contained in the subclaims.

The electropneumatic servo valve for controlling a volume current is constructed as a two-stage servo valve in an advantageous embodiment form in accordance with the invention, wherein one stage is an electromechanically acting preliminary control stage, which consists essentially of a nozzle impact plate system which is adjustable by means of a plunger coil magnet. The other stage, designated as valve main stage, is constructed as a 3/2 directional current valve, in an embodiment form to be discussed in the following, and is substantially composed of a separated housing with three boreholes for the air current connections, a control bush located in the interior and a control piston which is movable in the latter. According to the position of the control piston, the supply pressure connection P is connected, via an annular groove in the control piston, with a consumer terminal or operating terminal A via a cross-section which is more or less controllable in the opening or conducting direction. The position or positioning, respectively, of the control piston is directly dependent on the control air pressure in a control air space, which is arranged at the upper end of the control piston and through which the control piston can be driven against a restoring force in the form of a pressure spring. The control pressure itself is, in turn, dependent on the electric input current signals or voltage signals which are fed to the preliminary control stage and which constantly control the control pressure relations built up in the supply pressure by means of a dynamic change of position of the plunger coil, in accordance with the relations discussed in the following. The actuating force, which can be conducted from the control air pressure, is itself produced in an advantageous manner by means of utilizing the available supply air pressure in P, which can become active in a control air space between the valve main stage and the preliminary control stage because of the connection via a control air channel in the control piston and a control air current throttle in each position of the control piston. The pressure constantly building in the control air space is controllable in fine gradations by means of an impact plate, which can be moved by means of a measuring nozzle. This is effected in that the impact plate, driven by a plunger coil in the air gap of a ring magnet in the preliminary control stage, changes its distance relative to the measuring nozzle in proportion to the electric input signal and accordingly doses the outflowing control air current. In this manner, a coil movement or impact plate lift, respectively, brought about by relatively small electric input signals, effects an analog conversion of electric signals in control air pressures which, in turn, act on the control piston as variable actuating force and position the latter against the restoring force of a pressure spring. In the sense of an analog amplification of the input signal, a controllable application of pressure of the control piston and, accordingly, an actuating power relative to the position adjustment of the control piston, which actuating power acts in a variable manner on the latter, can be attained with relatively small electric currents in the preliminary control stage of the type indicated. The very substantial advantage of this arrangement is that the connection cross-sections of the operating terminal A with the supply terminal P or with the reverse current terminal R, which connection cross-sections are adjustable with the control piston in the valve main stage, are independent of the actuating force of the plunger coil magnet and, accordingly, of the electric power consumption of the preliminary control stage. The power consumption of the plunger coil is alone determined by means of the conception of the preliminary control stage, including the nozzle impact plate system.

An embodiment example of the invention is shown in the following description and with the aid of the drawings.

Shown are:

FIG. 1 the combination of a preliminary control stage, constructed as an electropneumatic signal transformer, with a valve main stage for the proportional control of a volume current or of a pneumatic pressure, respectively.

Figure 2:
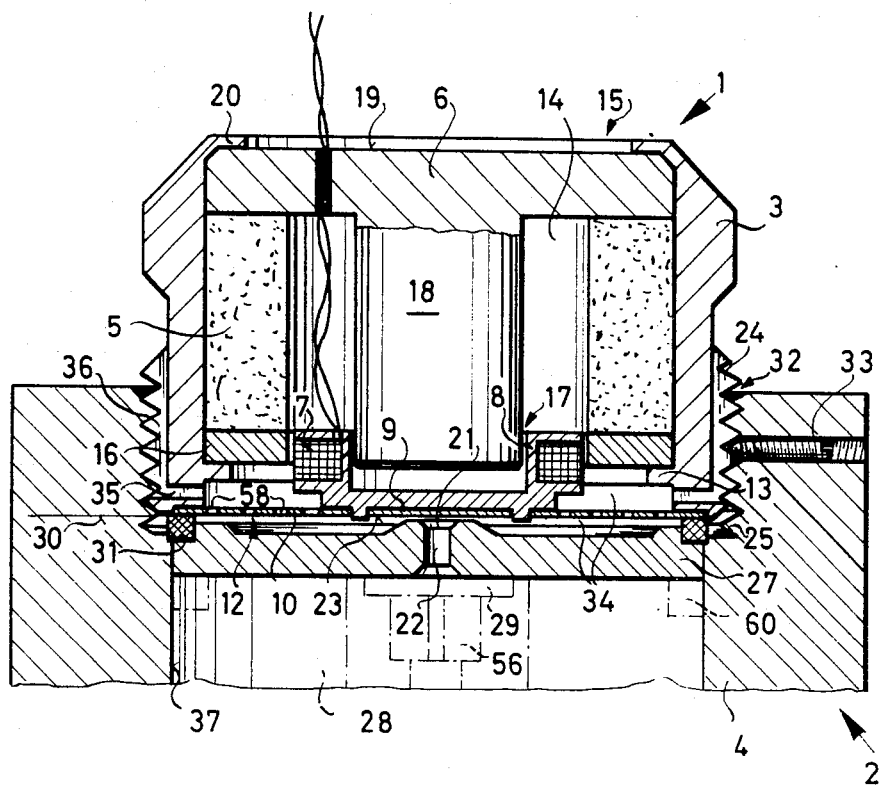

FIG. 2 an embodiment form of the preliminary control stage in section with simultaneous construction of the diaphragm spring as impact plate.

An embodiment form of the electropneumatic servo valve, according to the type described above, is composed of a preliminary control stage 1 and a valve main stage 2, wherein the devices of the preliminary control stage 1 are housed in a housing 3 and the devices of the valve main stage 2 are housed in a separate housing 4. Housed in the housing 3 as devices of the preliminary control stage 1 are a permanent magnet 5, an anchor 6, a plunger coil 7 with a specially constructed coil body 8 with an integrated impact plate 9. The coil body 8 with the impact plate 9 is carried by means of a diaphragm spring 10, in that the impact plate 9 is inserted in a self-locking manner in a corresponding borehole 11 in the diaphragm spring 10, e.g., by means of a press fit or in a form-locking manner. In accordance with the construction of the preliminary control stage 1, according to FIG. 2, an inwardly projecting collar 13 is provided in the cylindrical hollow space 14 of the preliminary control stage 1 near the end face 12 facing the valve main stage 2. This collar 13 serves to support an annular pole shoe 16 of the end face 15, which is open for the time being, which annular pole shoe 16 is inserted in the cylindrical hollow space 14. As the next part, a likewise annular permanent magnet 5 and, finally, an anchor 6, which is T-shaped in section, are inserted in the hollow space 14. The anchor peg 18 of the anchor 6 approximately closes with the lower edge of the pole shoe 16 in the insertion position. A border 20 of the housing 3, which border 20 projects over the outwardly directed anchor end face 19, is flanged inwardly and accordingly supports the parts inserted in the housing 3 in an unalterably defined position relative to the other functional planes determined by means of the structural form of the preliminary control stage 1. One of these above-mentioned functional planes is formed by means of the positioning of a surface 23 of an impact plate 9, which surface 23 cooperates with an outlet opening 21 of a control air nozzle 22. In an embodiment form shown according to FIG. 1, the impact plate 9 is part of a coil body 8, which is constructed in one piece, and is, as already mentioned, received in the central borehole 11 of the disk-shaped diaphragm spring 10. The diaphragm spring 10 is supported in a recess 26 in the inner wall of the housing 3. The currentless output position of the plunger coil 7 in the air gap 17 of the magnetic field between the pole shoe 16 and the anchor peg 18 is accordingly determined and the position of the acting surface 23 of the impact plate 9 is simultaneously defined with respect to the housing 3. A fine thread 24 is provided at a collar-like extended part of the housing outer wall of the preliminary control stage 1 for a continuous fine adjustment of the position of the preliminary control stage 1 relative to the valve main stage 2 and serves simultaneously as a fastening means for the connection with the valve main stage 2. By means of this fine thread 24, the complete preliminary control stage 1 can be screwed into a fine thread borehole 25 arranged on one end face in the housing 4 of the valve main stage 2. Because of the characteristic of a small lead of the thread in a fine thread, the preliminary control stage 1—and here, in particular, the diaphragm spring 10 with the impact plate 9, which diaphragm spring 10 is positioned in a secure connection relative to the housing 3—can be guided on at the outlet opening 21 of the nozzle 22 along a relatively large turning distance with correspondingly great accuracy. The nozzle 22 is provided in an exchangable nozzle plate 27, which can be inserted in the housing 4 with support on a cylindrical control bush 28. In order to ensure that the compressed air exits from a control air space 29 exclusively via the nozzle 22, an elastomer sealing element 31 is provided as a flexible intermediate layer between the nozzle plate 27 and the lower edge 30 of the housing of the preliminary control stage 1, in an embodiment form according to FIG. 1. With absolute sealing action, the sealing element 31 guarantees an adjustability of the position of the impact plate 9 in the preliminary control stage 1 relative to the nozzle 22 in the valve main stage 2 in the range of a selectable operating point. The insertion position of the nozzle plate 27 in the housing 4 of the valve main stage 2 is, in itself, insensitive to position within satisfactory limits because of the adjustability of the mutual positions between the impact plate 9 and the nozzle 22 which can be achieved by means of the fine thread 24, 25. An exact adjustment of the operating point is effected in particular instances by means of sensitively screwing in the preliminary control stage 1 in the housing 4 of the valve main stage 2. The operating point is correctly adjusted when there is a measurable change in the output signal of the valve main stage 2 under the given operating conditions. In order to fix the state of optimal operating point adjustment, an after-curing screw securing means 32 is provided in the thread of the fine thread 24, 25 between the housing parts 3 and 4 of the preliminary control stage 1 and the valve main stage 2. Such a substance-locking screw retention can be disengaged if necessary so that a readjustment of the setting of the operating point is also possible. Another securing means for fixing an operating point is given, as shown in FIG. 2, in that a set screw 33 is admitted laterally in the housing 4 of the valve main stage 2 by means of which a detachable, form-locking turning protection can be produced after the adjustment of the operating point by means of a notch effect in the fine thread 24 of the housing 3 of the preliminary control stage 1. Because of the variably adjustable distance between the impact plate 9 and the nozzle 22 at a separation point arranged in this area between the preliminary control stage 1 and the valve main stage 2, expenses regarding an adjustability and the necessary auxiliary means are saved to a great extent. The control air flowing out of the control air space 29 through the nozzle 22 and the openings 58 in the diaphragm spring 10 in the air space 34 around the impact plate 9 can flow off through boreholes 35 in the side walls of the housing 3 leading radially outward and through grooves 36 arranged perpendicularly relative to the boreholes 35, under atmospheric conditions. In order to ensure a free cross-section in the area of the thread of the fine thread 24 for the control air to flow out unimpeded, the grooves 36 are, e.g., cut deeper starting from the base circle of the fine thread 24.

As follows from FIG. 1, the valve main stage 1 is constructed as follows: a cylindrical borehole 37 is provided in the housing 4 of the valve main stage 1, in which borehole 37 the control bush 28 is inserted. The control bush 28 has outer annular grooves 38, 39, 40 which communicate in the insertion position with boreholes 41, 42, 43 for attaching the connection lines. The position of the control bush 28 in the borehole 37 is secured, on the one side, by means of support on a locking piece 44 with a central ventilation borehole 45, which is axially secured by means of a spring ring 46 in a groove 47 of the cylindrical borehole 37 in the housing 4. On the other side facing the preliminary control stage 1, the control bush 28 is secured by means of support at the nozzle plate 27, which is pressed against the control bush 28 over the sealing element 31 by means of the inwardly screwed preliminary control stage 1. The outer annular grooves 38, 39, 40 in the control bush 28 communicate via radially arranged boreholes 48, 49, 50 with annular grooves 51, 53 in a control piston 54 and with an inner annular groove 52 in the control bush 28. The control piston 54 is supported so as to be axially movable in a cylindrical borehole 59 of the control bush 28. The control bush 28 itself is sealed against the housing 4 by means of sealing rings 60. In its function as current control valve, for example, the borehole 43 (P) serves for the connection of a primary compressed air line; the secondary pressure line or operating pressure line is connected at the borehole 42 (A); finally, borehole 41 (R) serves to connect the exhaust line or reverse flow line. For the feed line of control air, the annular groove 53, which is constantly under primary pressure influence, communicates with the control air space 29 at the end of the control piston 54 facing the preliminary control stage 1 via a control air channel 55, which is arranged as a central borehole in the control piston 54, and via a control air current throttle 56. A pressure spring 57, which is supported on the locking piece 44, acts against the shearing force effect on the control piston 54 because of a variably controllable pressure in the control air space 29. An adjusting screw, which can be adjusted from the outside and is not shown in more detail, can be provided for adjusting the pressure spring force while retaining a ventilation borehole 45 as well.

The manner of functioning of the described embodiment example of an electropneumatic servo valve according to the drawing in accordance with FIG. 1 will be explained as follows in its characteristic as current control valve: e.g., the connection line for the primary pressure is arranged at the borehole 43 (P). The medium, air or another gas, characterized by overpressure, cannot become effective as operating air current at the consumer terminal at A because of the extreme upper position of the control piston 54, according to FIG. 1, since there is no through-going connection between the annular groove 53, which, in itself, constantly communicates with the supply air current connection at the borehole 43, and the consumer terminal in A. On the other hand, because of the overlapping position of the annular groove 51 of the control piston 54 with the inner annular groove 52 in the control bush 28 in the upper extreme position of the control piston 54, the valve main stage 2 is adjusted at a maximum cross-section of the consumer terminal at A in the reverse current direction relative to connection R. This setting is generally retained, in the embodiment example shown, so long as the prerequisites for a change of the position of the control piston 54, which position is set by means of the pressure spring 57, are not given by means of applying supply compressed air. A change of the position of the control piston 54 is achievable when it is provided that the pressure in the control air space 29 above the control piston 54 builds up to the extent that this pressure overcomes the restoring force of the pressure spring 57 as actuating force and correspondingly displaces the control piston 54 downward in accordance with FIG. 1. A transfer of the primary air pressure in the supply terminal at P into the control air space 29, which transfer is necessary for the above, is effected by means of a constant connection of the borehole 43, via the outer annular groove 40 and radial boreholes 50 in the control bush 28, with the annular groove 53, which, in turn, communicates with the control air space 29 via the control air channel 55 and the control air current throttle 56. If an adjustment of an air current controllable at the consumer terminal in A is desired, this is effected by means of a corresponding positioning of the control piston 54. A control of the plunger coil 7 proportional to the current is effected on the basis of electric input current signals. In accordance with the movement of the plunger coil 7, the impact plate 9 is guided, e.g., against the measuring nozzle 22, thereby limiting or impeding the outflow of control air from the control air space 29 and thus producing a control pressure in the control air space 29 of e.g., 1.5 to 6 b acting on the surface of the control piston. The control piston 54 is guided out against the pressure spring 57 because of this variably adjustable pressure in such a way that, after achieving a determined control piston position with increasing control pressure, an overlapping of the annular groove 53, which is under supply pressure, with the inner annular groove 52 and, accordingly, with the consumer terminal at A, takes place, wherein this overlapping is likewise increasingly adjustable in the cross-section. Before an effective connection of the supply terminal in P, which supply terminal is under primary pressure, with the consumer terminal in A, the connection between the consumer terminal at A and the reverse flow terminal in R, which connection was adjusted before this at a maximum opening cross-section, is closed.

If the signal current for controlling the plunger coil 7 is restored, then the relations are correspondingly reversed; i.e., the operating air current at the consumer terminal A is then correspondingly throttled and, in continuation, the connection from P to A is finally closed. After this, an exchange in the connection of the consumer terminal A to the exhaust or reverse flow terminal in R again takes place.

Substantial characteristic features for the construction and the manner of action of the electropneumatic servo valve of the type indicated are to be seen in that the device shown concerns a two-stage valve control consisting of an electropneumatic signal transformer stage or preliminary control stage 1 and a valve main stage 2, which is adjustable by means of the latter independent of load. With the preliminary control stage 1 as servo device, it is possible to control the volume current of a valve main stage 2 indirectly in an order of magnitude of e.g., 500 l/min. with small electric control currents up to approximately 200 mA. A particular advantage is that there is a proportional relationship between the electric signal current in the plunger coil 7 and the volume current at the consumer output in A. Moreover, because of the moved, small masses in the preliminary control stage 1, to which is preferably alotted the task of an electro-pneumatic control signal transformer, the servo valve is allowed a quick manner of reaction, which, in addition, also guarantees an accurate triggering of control processes effective over a high amplification effect. The cooperation of the electric signal transformer in the embodiment form of the preliminary control stage 1, including the impact plate 9, with the measuring nozzle 22 in the nozzle plate 27, which measuring nozzle 22 is arranged at the separation point of the valve main stage 2, is responsible for the quick reaction and fine dosing ability of the control of the pressure relations in the control air space 29 of the valve main stage 2. A prerequisite for an optimal control effect in the conversion of electric control signals into a pneumatic air pressure, by means of which one can control volume currents proportionally and in large compressed air quantities at the consumer outputs in finely dosable adjustment, is an exact adjustability of the operating points in ranges of 1/100 mm. By means of the fine thread 24, 25 at the housings 3 and 4 of the preliminary control stage 1 and of the valve main stage 2, the operating point can—in the insertion position of the valve main stage 2, as well—be adjusted with the greatest precision and individually adapted to the given conditions by means of providing the impact plate at the nozzle 22. When selecting an optimal operating point or a functionally favorable starting position of the impact plate 9, respectively, it is also advantageous to control the latter—proceeding from a middle position with reference to the control effect—so that, by means of a control current of e.g. +100 mA to −100 mA for the entire movement phase of the impact plate 9, one does not exceed a maximum effective current strength in the plunger coil 9 of 100 mA. It is possible to adjust the operating point by means of the fine thread 24, 25 in a continuous adjustment and in the insertion position with a basic setting of the impact plate 9 in a currentless state in a middle position of the control pressure at approximately 3.5 b within e.g. a control pressure phase width between 1.5 and 6 b. The resulting advantage consists in that the effective plunger coil currents are kept low and, accordingly, a minimum structural dimensioning is achievable, as is an improved dynamic behavior, because of the few moved masses. It must be mentioned that other gaseous media can be employed as pressure or flow elements in place of air without thereby substantially restricting the manner of functioning of the electropneumatic servo valve explained above. Finally, it is also immaterial whether the preliminary control stage 1 be arranged in a plane so as to be transverse relative to the valve main stage in a deviation of the axial arrangement relative to the valve main stage 2 according to FIG. 1.

We claim:

1. An electropneumatic servo valve for controlling a volume current or a pressure, respectively, comprising a preliminary control stage (1) for converting electrical signals into pneumatic control air pressure, a valve main stage (2) including a control piston (54), spring means (57) for applying a restoring force to said control piston (54), means defining a control air space (29) between said preliminary control stage (1) and said valve main stage (2) and a nozzle impact plate system (22, 9, 56), said valve main stage (2) being adjustable by means of said control air pressure of said preliminary control stage (1) in such a way that said control piston (54) of said valve main stage (2) ia driven against the action of the restoring force of said spring means by means of a control air pressure which can be converted in proportional pneumatic pressure in said control air space (29) between said preliminary control stage (1) and said valve main stage (2) by means of said electrical signals via said nozzle impact plate system (22, 9, 56) in such a manner that said control piston (54) is positioned for controlling a proportional air current in dependence upon said control air pressure.

2. Electropneumatic servo valve according to claim 1, characterized in that a control air channel (55) is provided in said control piston (54), which control air channel (55) connects an annular groove (53) in said control piston (54), which annular groove (53) communicates with the primary air pressure connection (P), with said control air space (29) between a measuring nozzle plate (27) and said control piston (54) in such a way that a primary air pressure builds up over said control air channel (55) and a control air current throttle (56) builds up pressure in said control air space (29) between said control piston (54) and said measuring nozzle plate (27); and in that said pressure can be controlled by means of an impact plate (9) dosing said control air current flowing out via a measuring nozzle (22) in such a way that said control piston (54) is adjustable to an opening cross-section which ensures the proportional volume current at the operating air current output (A) in dependence on the changable pressure in said control air space (29).

3. Electropneumatic servo valve according to claim 2, characterized in that the distance of said impact plate (9) from said measuring nozzle (22) is adjustable in proportion to the current or voltage, starting from a position of said impact plate (9) in a selected operating point, by means of applying current to a plunger coil (7) connected with said impact plate (9) in the magnetic field between a pole shoe (16) and an anchor (6) of said preliminary control stage (1) and accordingly the pressure in said control air space (29) is controllable.

4. Electropneumatic servo valve according to claim 2, characterized in that, in an arrangement of said valve main stage (2) for controlling a volume current and pressure, said annular groove (53) of said control piston (54), which annular groove (53) communicates with said primary pressure connection (P) (43), remains closed in the control-pressure-free state on the basis of the position of said control piston (54) adjustable in an end position by means of spring pressure (57), while a connection producible from said operating terminal (A) at a reverse flow line (R) is adjusted to the maximum opening cross-section.

5. Electropneumatic servo valve according to claim 4, characterized in that said annular grooves (53 and 51) of said control piston (54) communicate so as to be adjustable in a reciprically acting manner with said operating terminal (A) in dependence on the application of electric current signals to said plunger coil (7) and in such a way that a two-way volume current, which is adjustable in proportion to said current signals, is controllable at said operating terminal (A).

* * * * *